US008418990B2

(12) United States Patent
Podstawka et al.

(10) Patent No.: US 8,418,990 B2
(45) Date of Patent: Apr. 16, 2013

(54) MAGNETIC VALVE ACTUATOR FOR CONTAINER FILLING MACHINE

(76) Inventors: Grzegorz Podstawka, Webster, MA (US); John E. DeLuca, Woodstock, CT (US); James H. Turley, Richland, MI (US)

( * ) Notice: Subject to any disclaimer, the term of this patent is extended or adjusted under 35 U.S.C. 154(b) by 573 days.

(21) Appl. No.: 12/714,759

(22) Filed: Mar. 1, 2010

(65) Prior Publication Data

US 2011/0210275 A1 Sep. 1, 2011

(51) Int. Cl.
*F16K 31/08* (2006.01)

(52) U.S. Cl. ........... 251/65; 251/229; 251/279; 251/288

(58) Field of Classification Search .................... 251/65, 251/129.11, 228, 229, 231, 279, 318, 319, 251/286, 288; 74/25, 486, 86
See application file for complete search history.

(56) References Cited

U.S. PATENT DOCUMENTS

| | | | | |
|---|---|---|---|---|
| 2,346,904 | A * | 4/1944 | Carlson | 251/65 |
| 4,073,470 | A * | 2/1978 | Harris | 251/163 |
| 4,163,464 | A | 8/1979 | Velling et al. | |
| 4,280,682 | A * | 7/1981 | Zukausky et al. | 251/251 |
| 4,304,256 | A * | 12/1981 | Taiani | 137/556.3 |
| 4,671,486 | A | 6/1987 | Giannini | |
| 5,927,564 | A | 7/1999 | Simonazzi | |
| 5,960,838 | A | 10/1999 | Tietz et al. | |
| 6,179,016 | B1 | 1/2001 | Neacker et al. | |
| 2009/0071566 | A1 | 3/2009 | Knieling | |

OTHER PUBLICATIONS

An 11 page brochure entitled "Krones Mecafill VKP The reliable level filler", by Krones AG, apparently dated Jun. 2009, and in any event admitted prior art.

* cited by examiner

*Primary Examiner* — John K Fristoe, Jr.
*Assistant Examiner* — Marina Tietjen
(74) *Attorney, Agent, or Firm* — Quarles & Brady LLP

(57) ABSTRACT

Disclosed are valve actuator assemblies for high speed bottle filling machines. These actuators have a shaft that is pivotable on its longitudinal axis, a linkage fork connected to the shaft to pivot therewith, and a follower arm coupled by a magnetic coupling to the shaft. The magnetic coupling helps reduce carbon dioxide leakage. There may also be a second set of magnets which define pivoting dwell positions.

6 Claims, 6 Drawing Sheets

MAGNETIC VALVE ACTUATOR FOR CONTAINER FILLING MACHINE

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

The present invention relates to high speed equipment for filling bottles or other containers with liquids (especially carbonated liquids). More particularly it relates to actuator assemblies that control valve positioning in such equipment.

It is well known to fill bottles and other containers with liquids using automated equipment. For example, Krones AG commercializes a line of "Mecafill VKP" automated filling machines.

Fillers of this type progressively fill bottles at high speed as a line of the bottles are caused to move to, around and then away from the machine. Typically, there is an axially movable linkage structure and filling chamber over the top of each bottle as it is being filled. Controlled axial valve movement in each such filling chamber facilitates removal of air in the bottle and filling of the bottle with a beverage (or other liquid) and often carbon dioxide.

This is typically achieved by having the valving structure mechanically linked to an actuator, which in turn is pivoted by a cam follower arm. See e.g. the valve actuator 78 in U.S. Pat. No. 5,960,838.

One problem that has arisen in using such equipment is that various models of this type of equipment have a tendency to develop leakage of carbon dioxide over time. For example, leakage can occur along a passageway between a follower arm and a linkage fork shaft due to wear.

Another source of linkage is that many machines of this type use springs to hold various parts together or against each other. Those springs can lose their biasing force over time, and thereby lead to leakage.

Such leakage wastes carbon dioxide (and thus somewhat increased cost). Moreover, there is increasing regulatory interest in avoiding unnecessary carbon dioxide emissions (due to climate change concerns).

In various contexts magnetic couplings have been used as one means of transferring motion from one assembly part to another. See e.g. U.S. patent application publication 2009/0071566, and U.S. Pat. Nos. 4,163,464, 4,671,486, 5,927,564, and 6,179,016.

In any event a need still exists for improved valve actuators for use with high speed automatic bottle filling equipment.

SUMMARY OF THE INVENTION

In one aspect the present invention provides a container (typically a bottle) filling machine having a valve actuator assembly. The actuator assembly has a shaft that is pivotable on its longitudinal axis (preferably in a housing bore), a linkage (e.g. a fork) connected to the shaft to pivot therewith, and a follower arm coupled to the shaft by a magnetic coupling such that pivoting of the follower arm causes pivoting of the shaft, and thus pivoting of the linkage. The follower arm may in turn be pivoted by a driver (preferably a cam driver) of the container filling machine, and the linkage assists in controlling movement of a valve assembly of the container filling machine.

In a preferred form the magnetic coupling includes an outwardly (radially or axially outwardly) positioned magnet that is linked to the follower arm to pivot therewith, an inwardly (radially or axially inwardly) positioned magnet that is linked to the shaft to pivot therewith, and a stationary housing wall positioned between the outwardly positioned and inwardly positioned magnets. The magnets are preferably permanent/hysteresis type magnets. With a hysteresis type construction some of the drag properties are preferred.

The magnets may be of single piece construction (e.g. multi-polar), or an array of segmented arcs, or an array of segmented rectangular slabs. One such an array of segmented pieces has adjacent pieces of alternating polarity.

In an especially preferred form there is also a second set of magnets. In this form the housing extends around the shaft and there is a guide magnet positioned outward (e.g. radially outward) of the housing so as to pivot with the follower arm. There are also two docking/indexing magnets spaced (e.g. circumferentially spaced) around the housing. The guide magnet preferably functions in a bi-stable manner. In this regard it will tend to dwell adjacent either of the docking magnets when it is moved near them. However, between the circumferential docking positions there is little resistance to the pivoting.

The guide magnet has a first polarity and the docking magnets both have a second polarity. This second set of magnets helps the filler valving stay in its closed position without additional forces being required from springs or the like.

In another aspect of the present invention there is provided a container filling machine having a valve actuator assembly. In this aspect the valve actuator assembly has a shaft that is pivotable on its longitudinal axis, a linkage connected to the shaft to pivot therewith, and a follower arm coupled to the shaft such that pivoting of the follower arm causes pivoting of the shaft, and thus pivoting of the linkage.

The follower arm is pivotable by a driver of the container filling machine, the linkage assists in controlling movement of a valve assembly of the container filling machine, and a stationary housing extends around the shaft. A guide magnet is positioned outward of the stationary housing and pivots with the follower arm, two docking magnets are positioned on the stationary housing in spaced fashion, and the guide magnet will tend to be attracted to a docking magnet when pivoted adjacent thereto.

In yet another aspect of the present invention there is provided a valve actuator assembly suitable for use in such container filling machines. The assembly is capable of transferring motion from a cam driver to a valve seal. It has a housing having a central bore, a shaft that is pivotable in the bore on its longitudinal axis, a linkage fork connected to the shaft to pivot therewith, and a follower arm coupled to the shaft via a magnetic coupling such that pivoting of the follower arm structure can cause pivoting of the shaft, and thus pivoting of the linkage fork. The magnetic coupling is preferably of the above type, and there preferably is also such a second set of magnets for providing guided docking as described above.

The present invention reduces carbon dioxide leakage and also reduces maintenance issues for automated container filling equipment. It avoids the need for an extra aperture to link a cam follower to the sealing valve, thereby avoiding one possible leakage pathway. Further, the use of the second set of magnets to index and hold the valving at a firm seal position reduces leakage during the filling process due to weakening of a spring over time.

The actuators of the present invention can be produced at commercially reasonable cost. Further, they are capable of being incorporated as replacement parts in connection with a variety of existing high speed filling equipment models, without requiring substantial modification to the remainder of the machine or the actuator.

These and still other advantages of the present invention will be apparent from the detailed description and drawings. Of course, what follows is merely a description of preferred embodiments of the present invention. To assess the full scope of the invention the claims should be looked to.

DETAILED DESCRIPTION OF THE PREFERRED EMBODIMENTS

Figure 1:
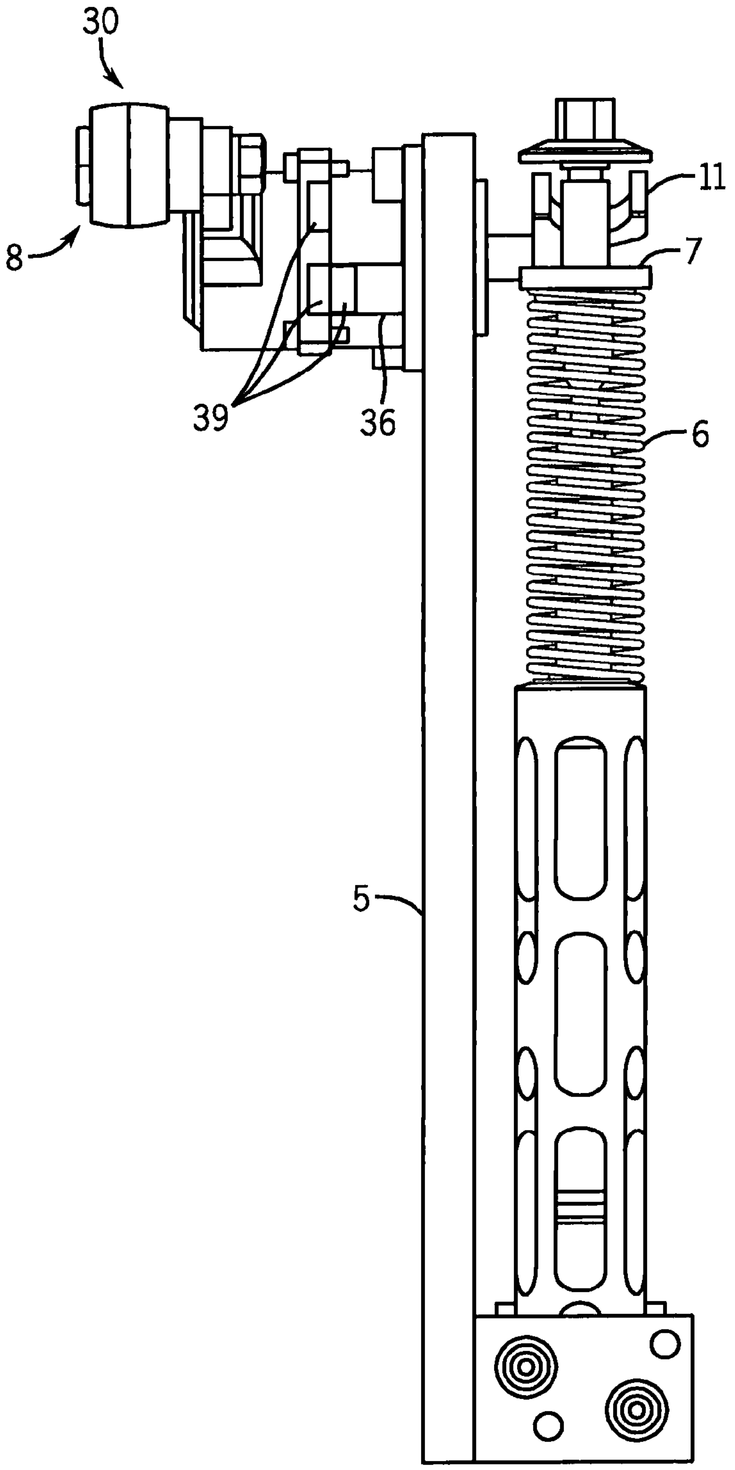
FIG. 1 is a front elevational view of an actuator of the present invention attached to a filling chamber portion of a conventional Krones type bottle filler machine.
Figure 2:
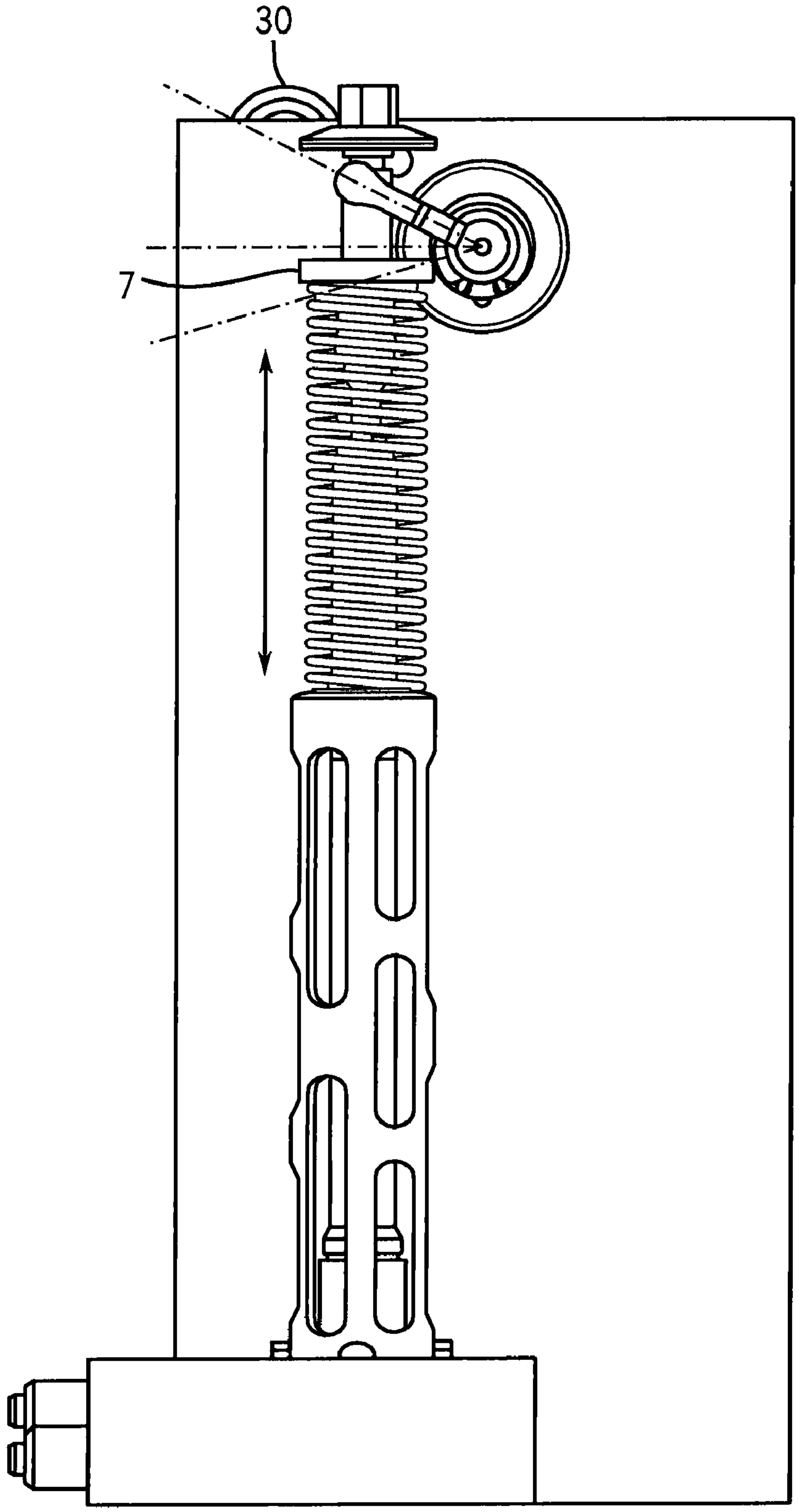
FIG. 2 is a right side elevational view thereof.
Figure 3:
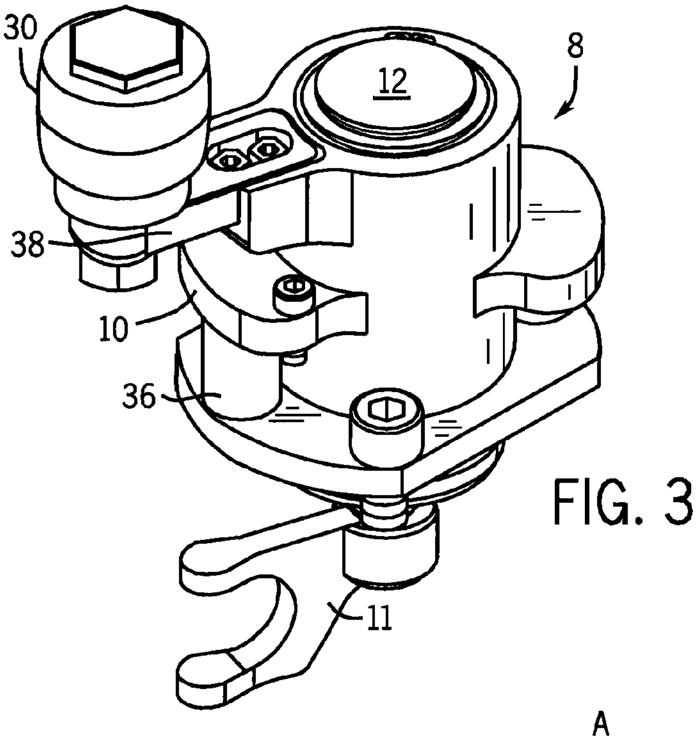
FIG. 3 is a perspective view of the FIG. 1 actuator assembly.
Figure 4:
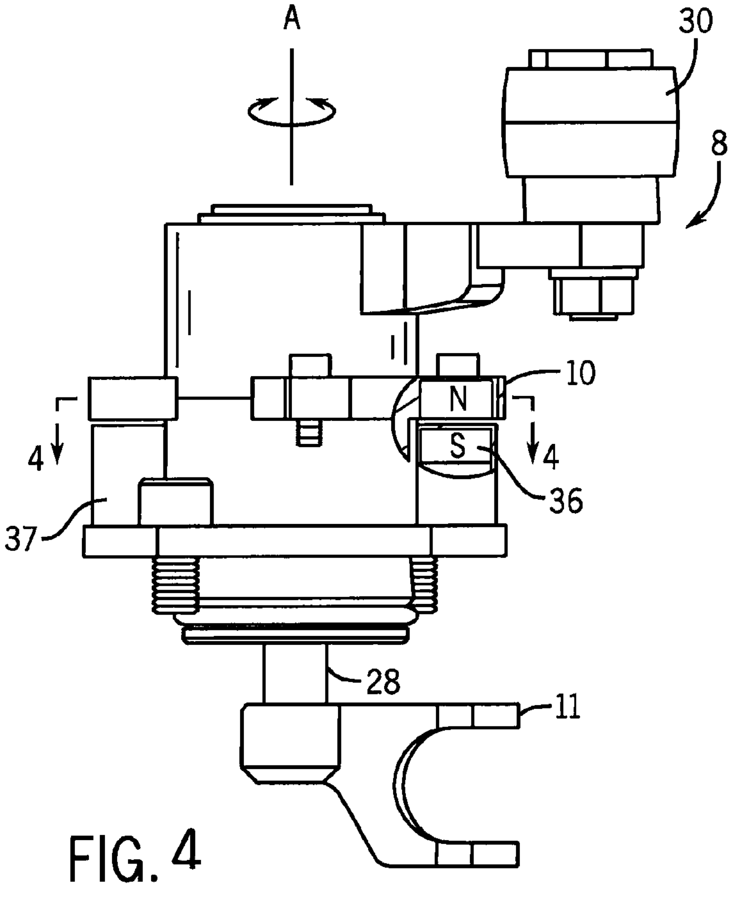
FIG. 4 is an elevational view thereof, with a portion partially in section.
Figure 5:
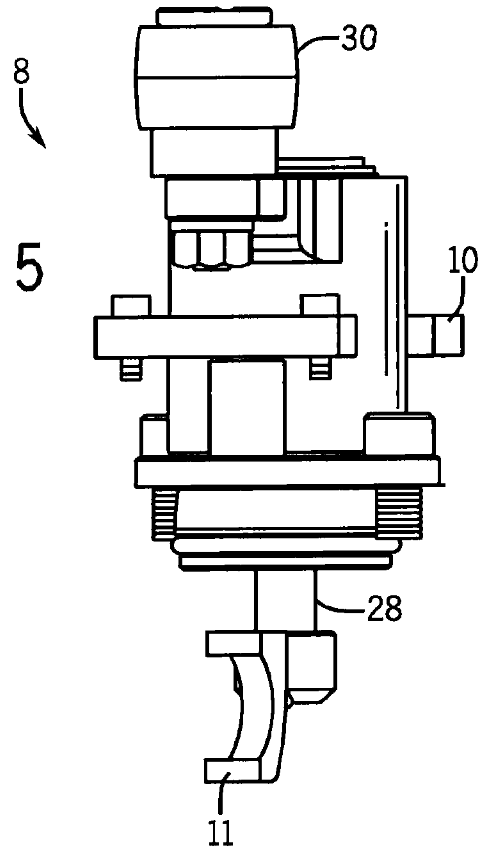
FIG. 5 is another elevational view thereof.
Figure 6:
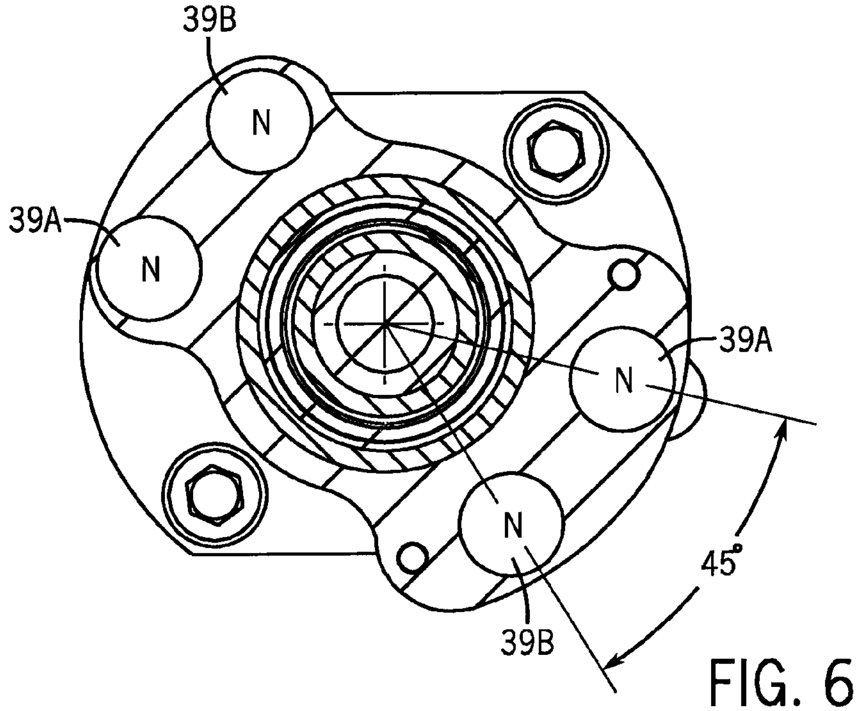
FIG. 6 is a sectional view taken along line 4-4 of FIG. 4.

FIG. 1 depicts the most relevant portion of a bottle filler machine of the present invention. There is a product (e.g. soda and carbonation) tank 5 in which is mounted a valving assembly 6 that is designed to open and close a soda bottle or the like during a filling process. The valving assembly has a contact surface 7 to transfer motion from a valve actuator 8 of the present invention to the sealing portions of the valving assembly 6.

Valve actuator 8 could be a replacement for a part like part 78 in U.S. Pat. No. 5,960,838. Alternatively and more preferably it could replace the mechanical actuator assembly of a Krones Mecafill high speed automated bottle filler.

The actuator 8 is designed to pivot a forked linkage 11 against and away from the contact surface 7. When driven into contact with the contact surface 7 the actuator drives the valving 6 to a seal position against the bottle being filled. When moved away from the contact surface 7 the actuator allows a spring to release a seal.

Turning now to FIGS. 2-8, in the preferred actuator 8 there is a follower roller 30 suitable to be contacted by a conventional cam drive (not shown) of the filling machine to cause a forward and back pivoting motion around longitudinal pivot axis A. This pivots shaft 28, which in turn pivots forked linkage 11.

In this regard, contacting the roller 30 drives a follower arm 38. This then drives the shaft 28 via arrays 42 and 44 of magnets which form a magnetic coupling. Note that no part of the follower arm 38 needs to pierce a sealed housing. Thus, there is no need to seal such an aperture, or risk that the seal will wear over time and thus leak.

Figure 7:
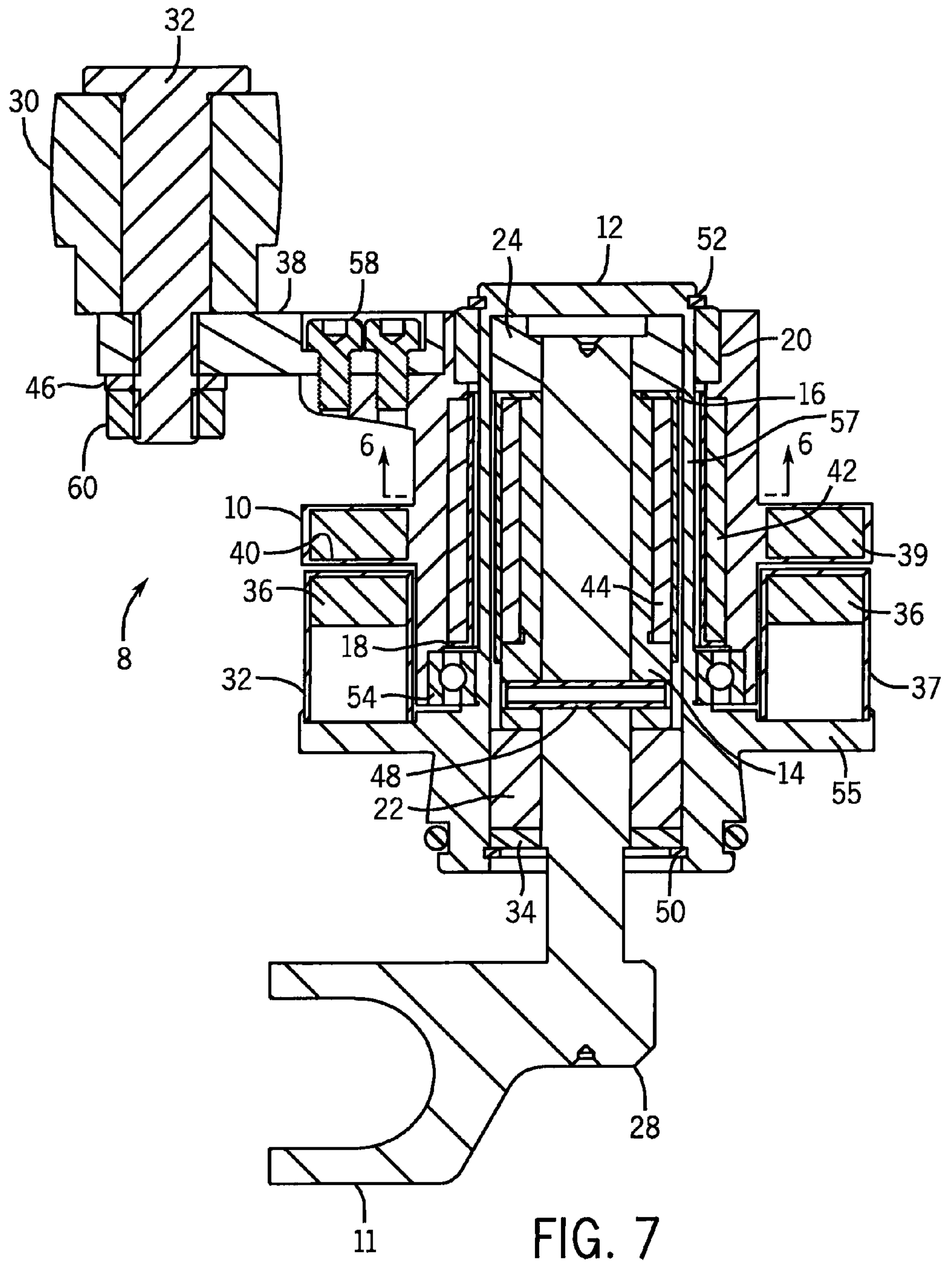
FIG. 7 is a vertical sectional view of the FIG. 3 actuator.

With particular reference to FIG. 7, note that there is an outer housing hub 10 linked via bolts 58 to the follower arm 38 to rotate therewith. The follower arm 38 supports a roller shaft 32 on which spins the follower roller 30. The roller 30 is held on shaft 32 via a lock washer 46 and a nut 60.

Figure 8:
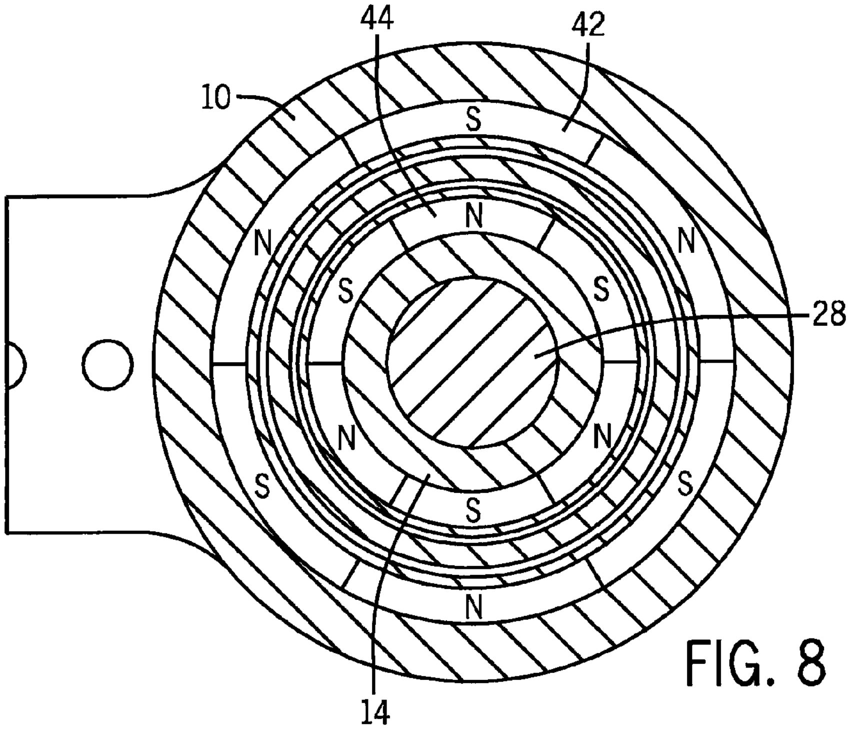
FIG. 8 is a sectional view taken along line 6-6 of FIG. 7.

As is evident from FIG. 8, the outer hub 10 retains an array 42 of radially outer magnets. This can be an array of six 60° arcs of alternating polarity magnets. They can be held in place via an outer magnet shield 18.

Similarly, an inner housing hub 14 supports an array 44 of inner magnets. As shown in FIG. 8 these can also be six 60° arcs of alternating polarity magnets. There is also an inner shield 16 to retain the array 44 of inner magnets in place and protect them.

The south polarity magnets in array 42 will seek to rotationally align with the north polarity magnets in array 44, and the north polarity magnets in array 42 will seek to rotationally align with the south polarity magnets in array 44.

It will be appreciated that because the inner array 44 seeks to keep its rotational alignment with respect to the outer array, pivoting of the roller 30 in response to cam drive causes the rotation of the hub 10, and then will cause rotation of shaft 28, even in the absence of a mechanical coupling between the hub and shaft.

As another important aspect of the invention, movement of the follower arm 38 is magnetically biased towards one of two docking positions by virtue of a second set of magnets 36/39. In this regard, the outer housing hub 10 has coves for receiving and retaining four button shaped docking magnets 39A-B. See FIG. 6. They are retained in the coves by magnet covers 40.

There is also a stationary housing 55 which supports two circumferentially spaced guide magnets 36 in guide towers 37. The guide towers are preferably 180° apart, and the docking magnets are preferably in two groups, each separated by about 45°. Further facilitating pivoting motion of the follower arm 38 and outer housing hub 10 is the bearing 54.

Without the magnets 36/39 the follower arm 38 could spin around the axis A without significant restraint. With these magnets there is a tendency of the outer hub to seek either an alignment where the guide magnets 36 are aligned with docking magnets 39A or alternatively an alignment where they are aligned with docking magnets 39B. One of these positions corresponds to a dwell position where the filling valve is sealed on the bottle. Another corresponds to a dwell position where the filling valve is not sealed on the bottle.

Because magnetic force facilitates the dwell positions, there is less need for springs that facilitate dwell positions or hold ceramic seals in abutment. This reduces maintenance issues, and reduces leakage between spring replacement.

An inside wall 57 of the stationary housing 55 helps define an internal bore. Within and adjacent the bore are positioned a variety of parts including the fork shaft 28, bushings 20, 22 and 24, an inner housing hub 14 linked via a transverse pin 48 to the fork shaft 28, a thrust washer 34, an outer barrier 12, and retaining rings 50 and 52.

The risk of leakage adjacent the connection between the follower arm 38 and shaft 28 is reduced as the shaft can be essentially hermetically sealed from the follower arm, yet still be caused to rotate/pivot as desired. Further, the forked linkage 11, and thus the valve assembly 6, are enabled to dwell at desired positions without relying solely on spring pressure and the like to hold the positions.

It should be appreciated that the principles of the present invention are not limited to the specific embodiment described herein. For example, any given filling machine will likely have fifty or more individual filling chambers, rather than just one. Further, the exact configuration of the filling chambers will vary based on what is being bottled.

Moreover, the linkage to the valve assembly need not necessarily be in the form of a fork on stem connection. Numerous other types of connections for converting pivoting motion to axial motion are likely to also be suitable.

Figure 9:
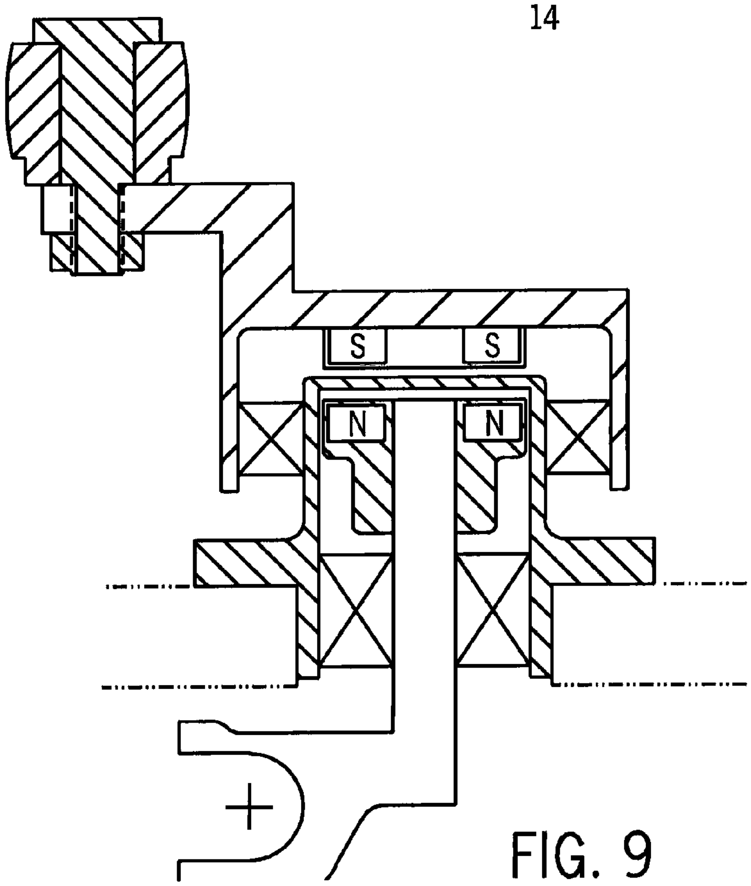
FIG. 9 is a second embodiment shown in a section somewhat analogous to FIG. 7.

Moreover, as shown in FIG. 9, the magnetic coupler can be formed by axially spaced arrays, rather than radially spaced arrays.

Therefore, the invention should not be limited to the specific embodiment described and/or depicted herein. Rather, the claims should be looked to in order to judge the full scope of the invention.

INDUSTRIAL APPLICABILITY

The invention provides improved valve actuator assemblies for use in automated container filler equipment, and such automated container filler equipment.

We claim:

1. A container filling machine having a valve actuator assembly, the valve actuator assembly comprising:

a shaft that is pivotable on its longitudinal axis;

a linkage connected to the shaft to pivot therewith; and a follower arm coupled by a magnetic coupling to the shaft such that pivoting of the follower arm causes pivoting of the shaft, and thus pivoting of the linkage;

wherein the follower arm is pivotable by a driver of the container filling machine; and wherein the linkage assists in controlling movement of a valve assembly of the container filling machine;

wherein the magnetic coupling comprises:

a first set of magnets comprising an outwardly positioned magnet and an inwardly positioned magnet, wherein the outwardly positioned magnet is linked to the follower arm to pivot therewith, and the inwardly positioned magnet is linked to the shaft to pivot therewith; and a stationary housing positioned between the outwardly positioned and inwardly positioned magnets;

wherein the stationary housing extends around the shaft, and there is a second set of magnets comprising a guide magnet and two docking magnets, wherein the guide magnet is positioned outward of the housing and pivots with the follower arm, and said two docking magnets are positioned on the stationary housing in circumferentially spaced fashion, and the guide magnet is attracted to one of the docking magnets of the second set of magnets when pivoted adjacent thereto.

2. The container filling machine of claim 1, wherein the guide magnet has a first polarity, and the docking magnets have a polarity opposite of the polarity of the guide magnet.

3. A valve actuator assembly for a container filling machine, comprising:

a shaft that is pivotable on its longitudinal axis;

a linkage connected to the shaft to pivot therewith; and a follower arm coupled to the shaft such that pivoting of the follower arm causes pivoting of the shaft, and thus pivoting of the linkage;

wherein the follower arm is suitable to be pivoted by a driver of a container filling machine;

wherein the linkage is suitable to assist in controlling movement of a valve assembly of the container filling machine; and wherein a stationary housing extends around the shaft, a guide magnet is positioned outward of the stationary housing and pivots with the follower arm, two docking magnets are positioned on the stationary housing in spaced fashion, and the guide magnet is attracted to one of said docking magnets when pivoted adjacent thereto.

4. The valve actuator assembly of claim 3, wherein the guide magnet is positioned radially outward of the stationary housing, and the docking magnets are positioned on the stationary housing in circumferentially spaced fashion.

5. The valve actuator assembly of claim 3, wherein the guide magnet has a first polarity and the docking magnets have a polarity opposite of the polarity of the guide magnet.

6. A valve actuator assembly suitable for use in a container filling machine to transfer motion from a driver to a valve seal, the valve actuator assembly comprising:

a housing having a central bore;

a shaft that is pivotable in the bore on its longitudinal axis;

a linkage fork connected to the shaft to pivot therewith; and a follower arm coupled via a magnetic coupling to the shaft such that pivoting of the follower arm causes pivoting of the shaft, and thus pivoting of the linkage fork;

wherein the magnetic coupling comprises:

a first set of magnets comprising an outwardly positioned magnet and an inwardly positioned magnet, wherein the outwardly positioned magnet is linked to the follower arm to pivot therewith, and the inwardly positioned magnet is linked to the shaft to pivot therewith; and a stationary housing positioned between the outwardly positioned and inwardly positioned magnets;

wherein the stationary housing extends around the shaft, and there is a second set of magnets comprising a guide magnet and two docking magnets, wherein the guide magnet is positioned outward of the housing and pivots with the follower arm, and the two docking magnets are positioned on the stationary housing in spaced fashion, and the guide magnet is attracted to one of said docking magnets when pivoted adjacent thereto.

* * * * *